United States Patent
Bae (10) Patent No.: US 10,147,257 B2
(45) Date of Patent: Dec. 4, 2018

(54) SYSTEMS AND METHODS FOR USER BASED VEHICLE ACCESS CONTROL

(71) Applicant: Faraday&Future Inc., Gardena, CA (US)

(72) Inventor: Hong S. Bae, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/331,572

(22) Filed: Oct. 21, 2016

(65) Prior Publication Data

US 2017/0116804 A1 Apr. 27, 2017

Related U.S. Application Data

(60) Provisional application No. 62/245,450, filed on Oct. 23, 2015.

(51) Int. Cl.
| | |
|---|---|
| *G07C 9/00* | (2006.01) |
| *B60R 25/24* | (2013.01) |
| *H04W 4/80* | (2018.01) |

(52) U.S. Cl.
CPC .......... *G07C 9/00896* (2013.01); *B60R 25/24* (2013.01); *G07C 9/00071* (2013.01); *G07C 9/00563* (2013.01); *G07C 9/00571* (2013.01); *B60R 2325/205* (2013.01); *G07C 2009/00539* (2013.01); *G07C 2009/00769* (2013.01); *G07C 2209/63* (2013.01); *G07C 2209/64* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2004/0263323 A1* | 12/2004 | Seike | ............... | B60R 25/1004 340/426.1 |
| 2013/0099892 A1* | 4/2013 | Tucker | ............... | G07C 9/00309 340/5.61 |
| 2013/0099940 A1* | 4/2013 | Protopapas | ........ | G07C 9/00087 340/904 |
| 2015/0233719 A1* | 8/2015 | Cudak | .................... | B60R 25/01 701/23 |
| 2015/0363986 A1* | 12/2015 | Hoyos | ............... | G07C 9/00563 340/5.61 |

FOREIGN PATENT DOCUMENTS

| | | |
|---|---|---|
| JP | 2007-113306 | 5/2007 |
| JP | 2014-218176 | 11/2014 |

* cited by examiner

*Primary Examiner* — Leon-Viet Nguyen
(74) *Attorney, Agent, or Firm* — Knobbe Martens Olson & Bear LLP (57) ABSTRACT

Systems and methods for remotely providing access to a secured vehicle are disclosed. The methods can include receiving a permission parameter from a primary user authorizing a secondary user to enter, receiving an access permission request from a secondary user, evaluating the access permission request for compliance with the permission parameter, and unlocking a door of the vehicle to allow the secondary user to access the vehicle. The permission parameter can include time, user, and proximity criteria for secondary user entry. Systems for remotely providing access to a secured vehicle or location can include a central telematics unit in communication with portable electronic user devices such as smartphones.

14 Claims, 4 Drawing Sheets

SYSTEMS AND METHODS FOR USER BASED VEHICLE ACCESS CONTROL

RELATED APPLICATIONS

This application claims the benefit of U.S. Provisional Application Ser. No. 62/245,450, filed on Oct. 23, 2015, entitled "SYSTEMS AND METHODS FOR USER BASED VEHICLE ACCESS CONTROL," which is hereby incorporate by reference in its entirety and for all purposes.

BACKGROUND

Field

This disclosure relates generally to the field of automotive technology, and more particularly to systems and methods for remotely allowing users to access secured vehicles.

Description of the Related Art

Remote keyless entry systems allow for access to secured vehicles without inserting a physical key into a door lock. However, an authorized user still must be in possession of an electronic key fob in order to enter a locked vehicle. Thus, a vehicle owner who wishes to grant access to a secondary user must transfer physical possession of a key fob to the secondary user. Remote keyless entry equipped automobiles are typically sold with two key fobs, and additional key fobs can only be acquired at significant extra expense.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a method of remotely providing access to a secured vehicle is described. The method may include one or more of the following: receiving at a secured vehicle a permission parameter from a primary user authorizing a secondary user to enter the vehicle, receiving at the vehicle an access permission request from a portable electronic device in the possession of the secondary user, evaluating the access permission request for compliance with the permission parameter, and unlocking a door of the vehicle to allow the secondary user to access the vehicle.

In another embodiment, a method of remotely providing access to a secured vehicle further includes detecting the presence of the secondary user in the vicinity of the vehicle or verifying the identity of the secondary user.

In another embodiment, a system for remotely providing access to a secured vehicle is described. The system may include a vehicle having a telematics unit configured to receive and store permission parameters for granting keyless access to the vehicle. The telematics unit may also be configured to receive access permission requests. The telematics unit may further be configured to evaluate access permission requests for compliance with permission parameters. The telematics unit may also be configured to unlock a door of the vehicle to enable access to the vehicle.

In another embodiment, the system may include a first portable electronic device having a processing circuit configured to enable input and transmission of permission parameters for providing access to the vehicle, and a second portable electronic device having a processing circuit configured to transmit access permission requests to the telematics unit. In some embodiments, the telematics unit may be further configured to detect the presence of a secondary user or secondary portable electronic device in the vicinity of the vehicle. In other embodiments, the vehicle may further include at least one visual or biometric recognition device configured to verify the identity of a user in or near the vehicle.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to participate in user based remote access or keyless entry systems. More particularly, it is contemplated that the described implementations may be included in or associated with a variety of applications such as, but not limited to: motor vehicles, non-motorized vehicles, aircraft, boats, buildings, and other objects or locations capable of being secured. Thus, the teachings are not intended to be limited to the implementations depicted solely in the Figures, but instead have wide applicability as will be readily apparent to one having ordinary skill in the art.

Figure 1:
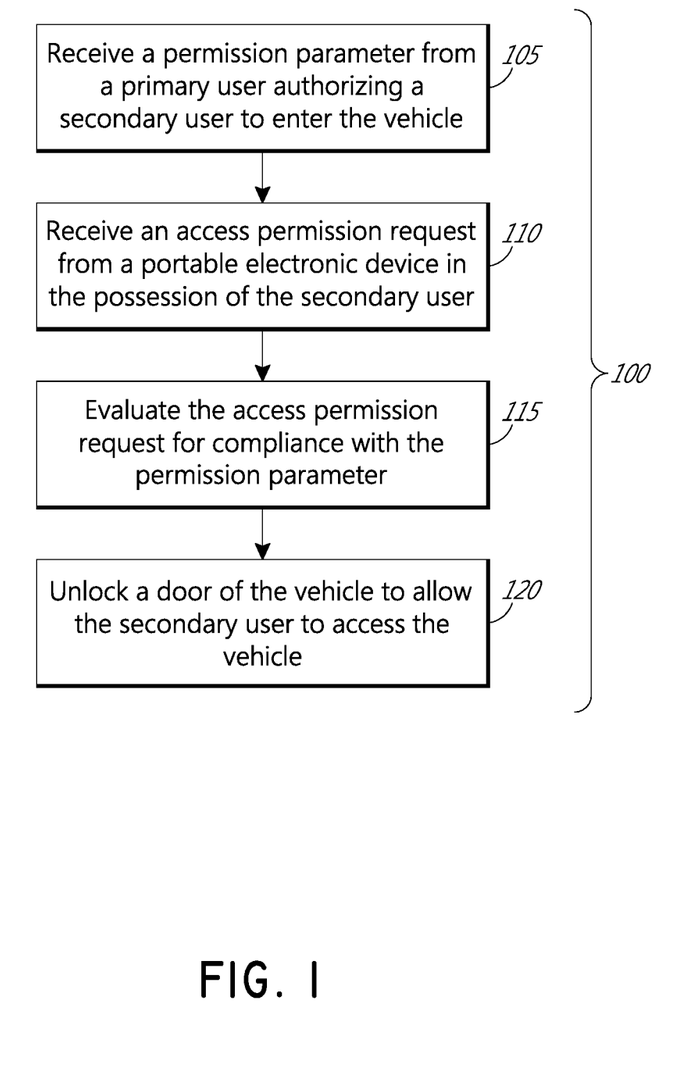
FIG. 1 is a block diagram illustrating an example flowchart according to one embodiment of a method for remotely providing access to a secured vehicle in accordance with an illustrative embodiment.

FIG. 1 is a flowchart depicting an exemplary method 100 for remotely providing access to a secured vehicle. In some aspects, the method 100 may be performed by a system 300, illustrated, for example, in FIG. 3.

As shown, the method 100 may begin with block 105, where a permission parameter is received at a vehicle from a primary user. The primary user may be an owner, co-owner, lessee, renter, or operator of the vehicle, or any other person similarly having the power to control access to the vehicle by other potential users. The permission parameter may authorize one or more secondary users to access the vehicle. The permission parameter may define one or more criteria that specify a particular secondary user who is authorized to access the vehicle, a particular time window during which access is authorized, and/or other criteria for granting access to the vehicle. The permission parameter may be received wirelessly at the vehicle by a telematics unit or other similar device in the vehicle capable of receiving wireless communications. Once a vehicle receives a permission parameter, the permission parameter may be stored there to be utilized when an access permission request is received as described further below.

The method 100 continues with block 110 when an access permission request is received. An access permission request may be received from a portable electronic device, such as a smartphone or similar device capable of wireless communication, in the possession of a secondary user seeking access to the vehicle. In some embodiments, the access permission request may contain additional information such as identifying information about the secondary user, biometric data obtained from the secondary user, identifying information about the portable electronic device, the location of the portable electronic device, or other information that may be used to compare with stored permission parameters. As with the permission parameter discussed above with reference to block 105, an access permission request may be received wirelessly at the vehicle by a telematics unit or other similar device in the vehicle capable of receiving wireless communications. Once the access permission request is received, the method 100 may proceed to block 115.

At block 115, the method 100 may evaluate the access permission request to determine whether the access permission request is in compliance with the permission parameter received in block 105. The evaluation of the access permission request may include the steps of comparing the criteria of a permission parameter with the data in the access permission request to determine if the access permission request is in accordance with each criterion of the permission parameter. If the vehicle has received multiple permission parameters and more than one permission parameter is still stored at the vehicle, the method may evaluate the access permission request in relation to multiple stored permission parameters to identify all permission parameters with which the access permission request is in compliance. If multiple permission parameters are stored at the vehicle and the access permission request is determined not to be in compliance with a permission parameter, the method 100 may continue by checking other of the multiple stored permission parameters until compliance is found. If the access permission request is determined not to be in compliance with any stored permission parameter, the method 100 terminates and the vehicle remains secured. If the access permission request is determined to be in compliance with at least one stored permission parameter, the method 100 proceeds to block 120.

At block 120, a door of the vehicle is unlocked to allow the secondary user to access the vehicle. Unlocking of a door of the vehicle may be carried out automatically by any physical, electrical, magnetic, or computerized means, or any combination thereof. In various embodiments, only one door, multiple doors, only the engine hood, only the trunk/cargo compartment, or any combination of doors, engine hood, and trunk/cargo compartment of the vehicle may be unlocked. In some embodiments, the unlocking is only temporary, and the vehicle may lock again after a preset time period or upon a door locking command initiated by the secondary user within the vehicle. A notification may also be sent to the primary user indicating that the vehicle has been unlocked in compliance with a permission parameter previously sent by the primary user.

Figure 2:
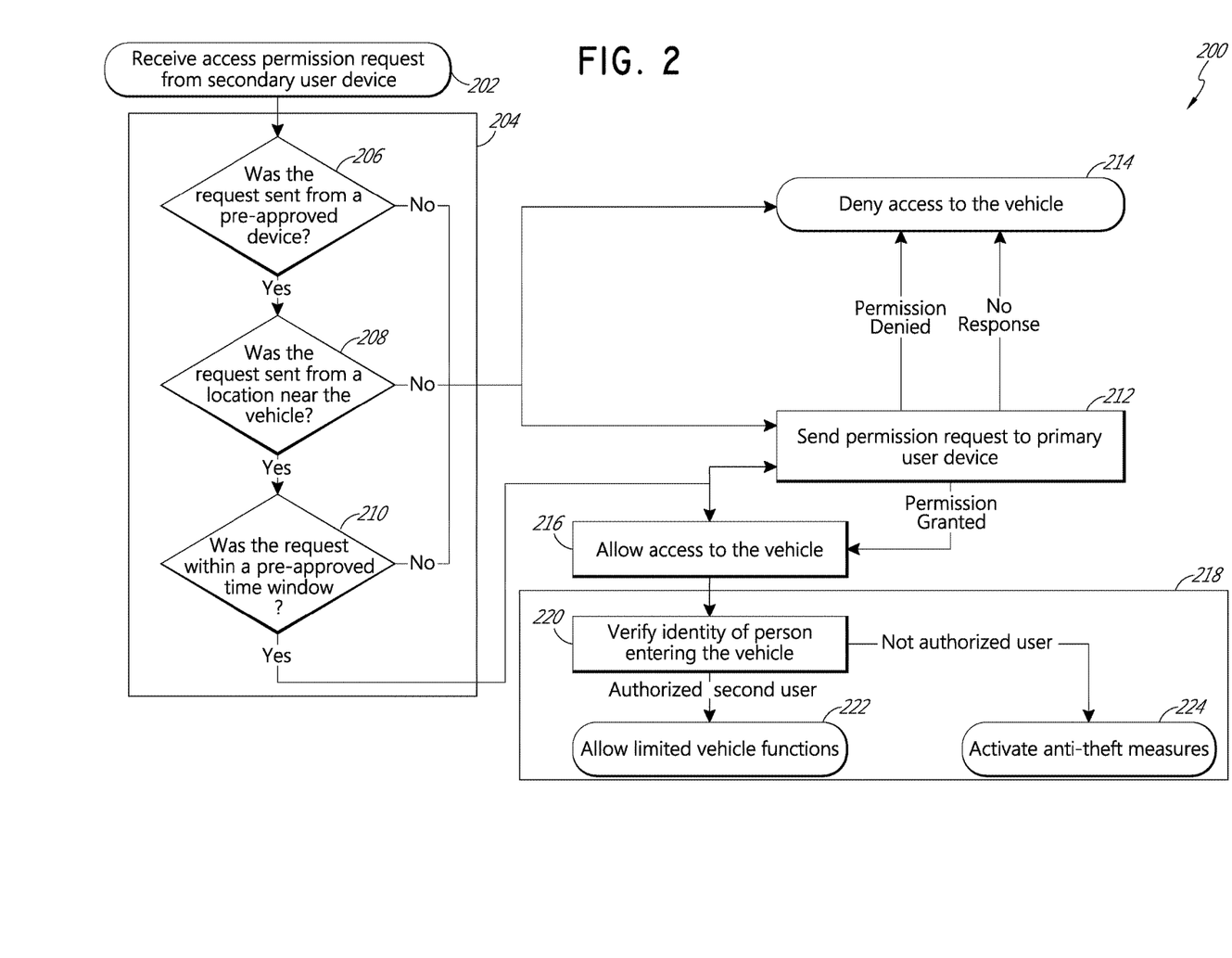
FIG. 2 is a block diagram illustrating an example flowchart according to one embodiment of a method for remotely providing access to a secured vehicle in accordance with an illustrative embodiment.

FIG. 2 is a flowchart depicting an exemplary method 200 for remotely providing access to a secured vehicle. The method 200 is one particular example of a method in accordance with FIG. 1. In some aspects, the method 200 may be performed by systems 300 and/or 400, shown in FIG. 3 and/or FIG. 4.

The method 200 may begin with block 202, where an access permission request is received from a secondary user device. In some aspects the access permission request may comprise the same or similar features as the access permission request shown in block 110 above with reference to FIG. 1. The secondary user device may be a portable electronic device in the possession of a user wishing to access a vehicle. Once an access permission request is received the method 200 proceeds to an evaluation process 204.

The evaluation process 204 begins with block 206, where the access permission request may be evaluated with regard to the sending device. Block 206 may use received data identifying the portable electronic device from which the access permission request was sent. In some embodiments the portable electronic device may be identified by use of a telephone number, media access control (MAC) address, near field communication (NFC), or the like. The identifying information of the portable electronic device may be compared with a stored list of pre-approved electronic devices to check for compliance. Electronic devices can be pre-approved by means of permission parameters from a primary user as shown above in block 105 with reference to FIG. 1. If the method 200 determines that the secondary user device requesting access has not been pre-approved for access, the method 200 may terminate by proceeding to block 214 denying access to the vehicle, or the permission parameter may be forwarded 212 to a primary user device for individual evaluation of the request by a primary user. If the method 200 determines that the secondary user device requesting access has been pre-approved for access, the method may continue to block 208.

At block 208, the access permission request is further evaluated to determine whether the request was sent from a location near the vehicle. A user requesting access to a vehicle may be required to be in the immediate vicinity of the vehicle to ensure that only the intended secondary user is allowed to access the vehicle, or for other security purposes. In some embodiments, the evaluation of block 208 may require location data from the secondary user device, which may be obtained from GPS, wireless local area network (WLAN) or Wi-Fi-based positioning systems, or the like. In other embodiments, the vehicle may determine whether the secondary user device is nearby through communication by NFC, WLAN/Wi-Fi, Bluetooth, or similar proximity-based, local-area, or short-distance electronic communication protocols. Similar to the outcomes of block 206, if the method 200 determines that the secondary user device requesting access is not located in the immediate vicinity of the vehicle, the method 200 may terminate by proceeding to block 214 denying access to the vehicle, or the permission parameter may be forwarded 212 to a primary user device for individual evaluation by a primary user. If the method 200 determines that the secondary user device requesting access is located in the immediate vicinity of the vehicle, the method may continue to block 210.

At block 210, the access permission request is further evaluated to determine compliance with a specified time window. A primary user creating an access permission parameter may allow a particular secondary user to access a vehicle only during a specified time window. A time window limitation of a permission parameter may accomplish various purposes related to security, such as preventing access by unauthorized third parties in the event that an authorized secondary user's portable electronic device is lost or stolen. The evaluation of block 210 may use internal time data from the device executing method 200, external time data obtained from the secondary user device, a cellular network, mobile data network, or the like, or any combination of internal and external time data. If the method 200 determines that the access permission request was not received within a pre-approved time window, the method 200 may terminate by proceeding to block 214 denying access to the vehicle, or the permission parameter may be forwarded 212 to a primary user device for individual evaluation by a primary user. If the method 200 determines that the access permission request was received within a pre-approved time window, the evaluation process 204 may be completed successfully.

In some embodiments, the evaluation process 204 may comprise additional evaluative steps. For example, a secondary user requesting access may be required to enter a code, fingerprint, voice command, or other forms of identification information into the secondary user device for greater accuracy in recognition of secondary users and secondary user devices. Such additional data inputs would then be compared to allowed codes or fingerprint profiles in a method consistent with the evaluations performed in blocks 206, 208, and 210. If compliance is found for all additional evaluative steps, the evaluation process 204 may similarly be completed successfully.

If the evaluation process 204 is completed successfully, the method may proceed to block 216 allowing the secondary user to access the vehicle by unlocking a door of the vehicle. In some embodiments, the method may require a further layer of security by proceeding instead to block 212, sending the compliant access permission request to the primary user for confirmation. In block 212, the primary user may receive a notification that a received access permission request has been determined to comply with a permission parameter sent by the primary user. The primary user may then be enabled to grant or deny the permission request. If the primary user denies or fails to respond to the permission request, the secondary user may be denied access 214 to the vehicle. If the primary user grants the permission request, the vehicle can allow access 216 for the secondary user by unlocking a door of the vehicle.

In some embodiments, the method 200 may require an additional verification process 218 after allowing a secondary user to enter a vehicle. The verification process begins at block 220, where the identity of a person entering the vehicle is determined. Identity may be determined by collecting visual or biometric information from a person within the vehicle and comparing the collected visual or biometric information with previously entered information of authorized secondary users. For example, the person entering the vehicle may provide a fingerprint sample using a fingerprint reader within the vehicle, and the collected fingerprint may be compared with a known fingerprint of the authorized secondary user to confirm that the person entering the vehicle is the authorized secondary user. In some embodiments, a camera may be used to obtain an image of the person entering the car, which may be compared by facial recognition software with a known photograph of the authorized secondary user. If the person entering the car is determined to be the authorized secondary user, the method may terminate by proceeding to block 222.

Figure 3:
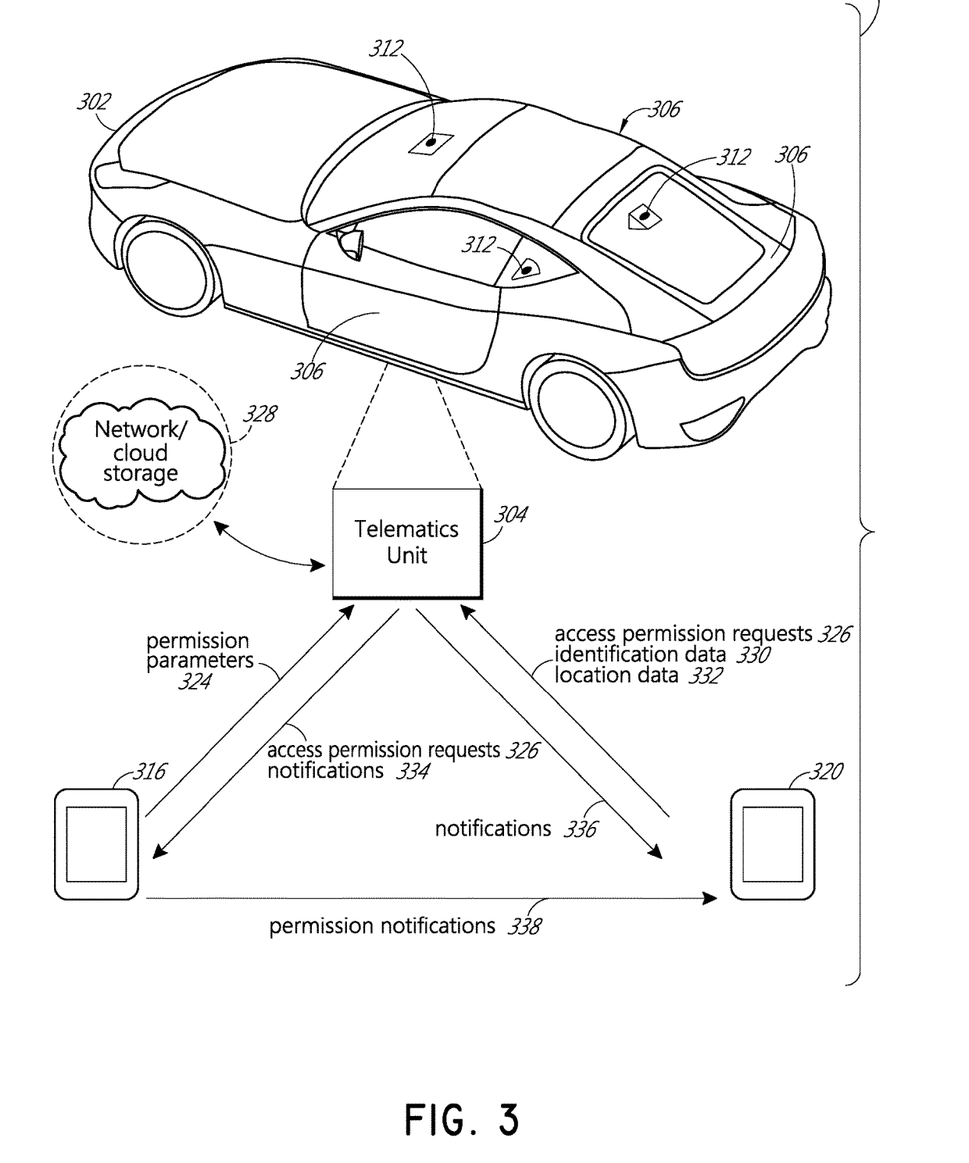
FIG. 3 depicts an exemplary system for remotely providing access to a secured vehicle in accordance with an illustrative embodiment of the present disclosure.
Figure 4:
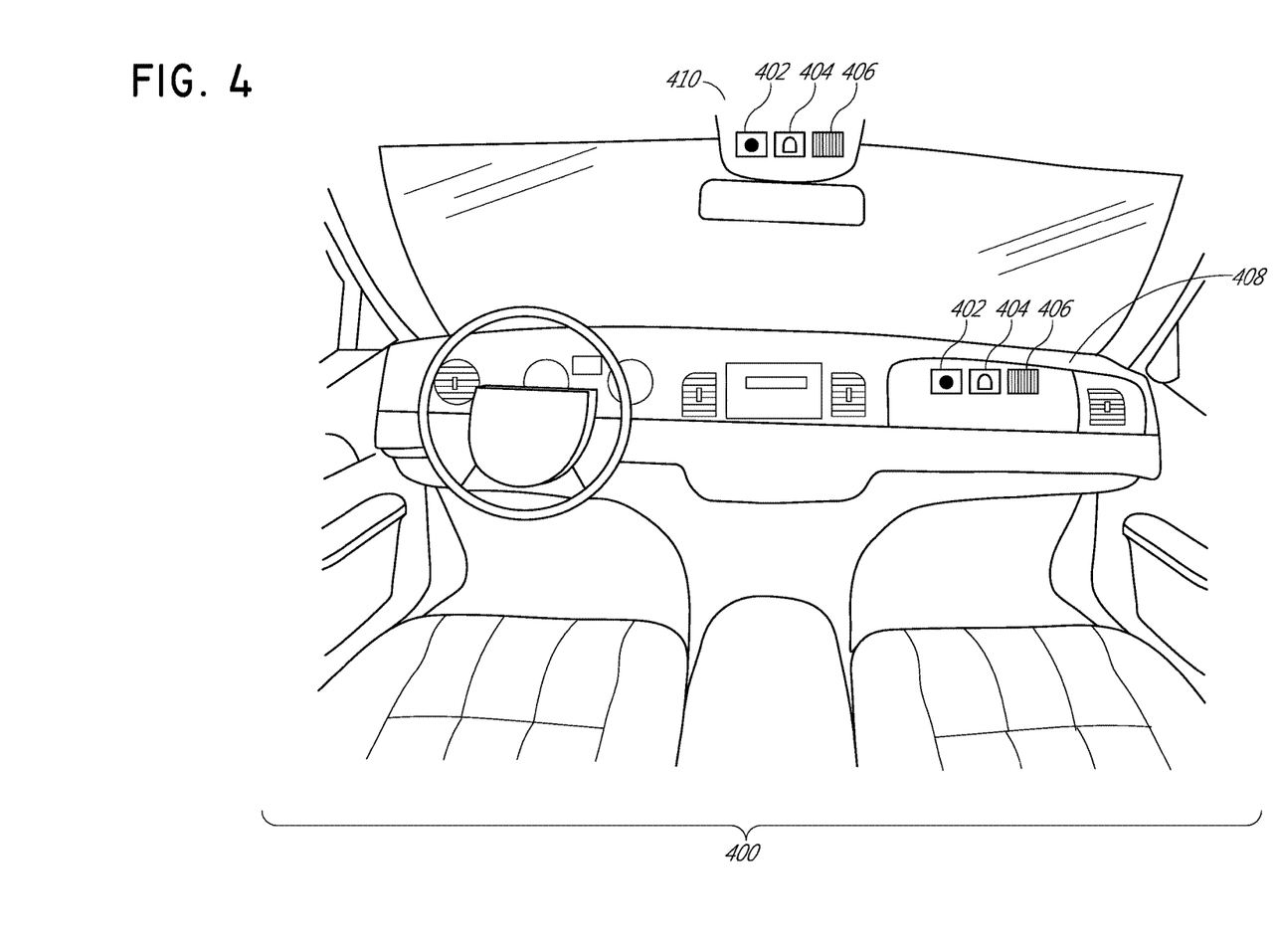
FIG. 4 depicts an example of a configuration of at least one visual or biometric recognition device in a vehicle interior in accordance with an illustrative embodiment.

In some embodiments, when an access permission request is received from a secondary user device 202, the systems 300 and/or 400 can prompt the secondary user device to open a direct communication channel with a primary user device of a primary user. For example, the systems can prompt the secondary user device 202 to initiate a voice or video call with the primary user device so that the primary user can directly confirm, for example, the identity and location of the secondary user. Once confirmed, the primary user can send a command remotely using the primary user device to grant vehicle access to the secondary user. In some embodiments, a direct communication channel (e.g., voice/video call) can be automatically initiated on the secondary user device 202 when the systems receive the access permission request and/or detect that the secondary user device 202 is in close proximity of the vehicle.

At block 222, the authorized secondary user is confirmed to have entered the vehicle, and limited vehicle functions may be allowed for the comfort and safety of the secondary user. For example, the secondary user may be able to open the vehicle's windows and/or activate the vehicle's heating, ventilation, and air conditioning (HVAC) system to maintain a comfortable temperature within the vehicle. In another example, the secondary user may be able to activate an in-vehicle entertainment or infotainment system present in the vehicle for entertainment purposes, to avoid boredom, and/or to communicate with a primary user or others.

Safety considerations may require that certain other vehicle functions be prohibited while an authorized secondary user is within a vehicle in the absence of a primary user with a key fob. For example, while in the car with limited features allowed, a secondary user may still be prohibited from starting the automobile powertrain or disengaging the parking pawl or brake. In some embodiments, certain prohibited features may still be activated by the vehicle when necessary for proper operation of an allowed feature. For example, when a secondary user in an electric vehicle activates the allowed HVAC functions, the vehicle may have to engage the high-voltage battery system of the powertrain to provide sufficient power for the HVAC system. In this exemplary case, the vehicle may automatically activate some parts of the powertrain, such as a high voltage battery system and/or combustion engine in an electric vehicle with range extending devices, while still prohibiting the secondary user from engaging the transmission, disengaging the parking pawl, or otherwise using any driving function of the vehicle. In other embodiments, the secondary user may be given full control of the vehicle once the secondary user is granted access to the vehicle.

However, if the person entering the car is determined to be someone other than the authorized secondary user, the method may instead terminate by proceeding to block 224. At block 224, anti-theft measures may be activated in response to the presence of an unauthorized user in the vehicle. For example, the vehicle may disable all functionality to prevent the unauthorized user from stealing or damaging the vehicle. In some embodiments, the anti-theft measures may include activating an audible car alarm, notifying the primary user and/or police, and activating a vehicle tracking/recovery system such as OnStar, LoJack, or the like.

It is noted that any step in methods 100 or 200 may further comprise a notification of a primary user. For example, the primary user may be notified when a permission parameter is successfully stored, an access permission request is received or evaluated, or a secondary user enters the vehicle. In some embodiments, the primary user may be notified of any change in vehicle status, such as activation of HVAC or other limited functionality by a secondary user, entry by an unauthorized person, or activation of anti-theft measures.

In some embodiments, notifications may be interactive. For example, a primary user may have the option to turn off the HVAC system in response to a notification that HVAC has been activated. In another example, a primary user notified of anti-theft activation may have the option to deactivate the anti-theft measures if the unauthorized access detection is believed to be erroneous, or if the primary user wishes to retroactively authorize access by the person in the vehicle.

The exemplary methods shown in FIG. 1 and FIG. 2 may offer improved solutions to various logistical challenges frequently faced by vehicle owners. For example, such methods may be of use to vehicle owners who wish to allow their children to access the vehicle but prefer not to entrust their children with the full access to driving functionality associated with a key fob of the vehicle. In one such exemplary situation, a parent may park a family vehicle near a child's school before running errands nearby. While running errands, school ends for the day, and the child may wish to get into the family vehicle for purposes of safety and/or comfort from natural elements, strangers, and the like. If the parent is not at the vehicle when the child arrives, the methods shown in FIG. 1 and FIG. 2 may be used to allow the child to enter the safety and comfort of the vehicle while allowing the parent to complete all necessary errands and avoiding any possible injury or damage that could result from a child with a key fob accidentally or negligently driving the vehicle. Thus, these methods allow access for pre-approved users in a secure, multi-layer approach and the potential for unauthorized access by hackers is minimized. It will be readily apparent that the methods disclosed will also be applicable to a wide variety of other situations not disclosed herein, particularly where a vehicle owner, lessee, or renter wishes to grant access to any other person without transferring possession of a key fob.

FIG. 3 depicts an exemplary system 300 for remotely providing access to a secured vehicle in accordance with an illustrative embodiment of the present disclosure. In this embodiment, the system 300 includes a secured motor vehicle 302 containing a telematics unit 304 disposed at a location within the vehicle, and access doors 306 capable of being locked to secure the vehicle. The vehicle 302 may further include at least one externally facing camera 312 configured to communicate, either wired or wirelessly, with the telematics unit 304. The system further includes a primary portable electronic device 316 for use by a primary user with authority to authorize others to access the vehicle, and at least one secondary portable electronic device 318 for use by a secondary user who may request access to the vehicle.

The telematics unit 304 comprises at least a processing circuit and in some aspects may be integrated with the traditional features of a telematics control unit (TCU), "carputer," or similar device known in the automobile industry. The telematics unit 304 may further include a GPS unit, a microcontroller, and/or an interface for mobile communication. In this context, mobile communication may include any one or a combination of protocols such as GSM, GPRS, WLAN, Wi-Fi, LTE, or the like. The microcontroller of telematics unit 304 may be configured to control unlocking and/or locking of at least one door of the vehicle when required in accordance with the methods depicted in FIG. 1 and FIG. 2, or similar circumstances.

The primary portable electronic device 316 may be a smartphone or similar device comprising a processing circuit and a communication interface enabling wireless communication with the telematics unit 304. In some embodiments, the primary portable electronic device 316 can be integrated as a part of another vehicle. The processing circuit of the primary portable electronic device 316 may be configured for input, by a primary user, of permission parameters 324 governing access to the vehicle, and to transmit permission parameters 324 to the telematics unit 304 via the communication interface of the primary portable electronic device 316.

The secondary portable electronic device 320, like the primary portable electronic device 316, may be a smartphone or similar device comprising a processing circuit and a communication interface enabling wireless communication with the telematics unit 304. The processing circuit of the secondary portable electronic device 320 may be configured for input, by a secondary user, of access permission requests 326, and to transmit access permission requests 326 to the telematics unit 304 via the communication interface of the secondary portable electronic device 320. The secondary portable electronic device 320 can also include a fingerprint scanner, camera, microphone, speaker, one or more biometric sensors, touch screen, key pad, and/or other input/output devices. In some embodiments, the secondary portable electronic device may include a wearable device.

In an exemplary operation, a primary user can begin the operation of the illustrated system 300 by entering a permission parameter 324 using the primary portable electronic device 316. The primary portable electronic device 316 transmits the permission parameter 324 to the telematics unit 304 of the vehicle 302 via GSM, GPRS, WLAN, Wi-Fi, LTE, or a similar wireless communication system. When the permission parameter 324 reaches the telematics unit 304, it is stored for later evaluation of permission requests. A permission parameter 324 may be stored in a physical memory unit of the telematics unit 304 or remotely in network or cloud storage or the like 328, where it may be accessed later by the telematics unit 304.

A secondary user in possession of the secondary portable electronic device 320 may approach the vehicle 302. In the vicinity of the vehicle 302, the secondary user enters an access permission request 326 through the secondary portable electronic device 320. The access permission request 326 is then transmitted to the telematics unit 304 of the vehicle 302 via GSM, GPRS, WLAN, Wi-Fi, LTE, or a similar wireless communication system. The secondary portable electronic device 320 may also transmit to the telematics unit identification data 330 and/or location data 332 of the secondary user and/or the secondary portable electronic device 326.

When an access permission request 326 is received at the telematics unit 304, it is evaluated to determine if it complies with an existing permission parameter 324, in accordance with the evaluation process 204 shown above with reference to FIG. 2. If the access permission request 326 complies with an existing permission parameter 324, a door 306 of the vehicle 302 can be unlocked by the telematics unit 304 to allow access.

In some embodiments, the system 300 may include external camera functionality. The externally facing camera or cameras 312 may be configured to capture images at the command of the telematics unit. In some embodiments, the camera or cameras 312 may be mounted inside the front or rear windshield, in a side window, or in any other location or combination of locations at the exterior of the vehicle 302 where they may clearly capture a photo of at least the face of a person standing near the vehicle 302.

External camera functionality may be useful in a variety of situations. For example, an authorized secondary user may wish to request access for both the secondary user and a third party, such as a friend or family member of the secondary user, who has not been pre-approved for access to the vehicle 302. In this exemplary situation, the approved secondary user may send an access permission request 326 to the vehicle 302 for both the secondary user and the third party. Upon receiving the request 326 for third-party access, the system may request the third party to stand in front of an externally facing camera 312, enabling the externally facing camera 312 to capture an image of the third party requesting access. The image of the third party may then be sent with an access permission request 326 from the telematics unit 304 to the primary portable electronic device 316, where the primary user may view the image and determine whether to grant or deny the secondary user's request 326 for third-party access to the vehicle 302.

In another example, external camera functionality may be useful where an authorized secondary user wishes to request access but is not in compliance with one or more criteria of a permission parameter 324, such as when the secondary user arrives at the vehicle before or after a pre-approved time window for access. In this case, the user may send a special request 326 to the primary user through a smartphone application and an externally facing camera 312 may be used as described above to verify the identity of the secondary user.

In some embodiments, additional notifications may be transmitted and received by devices within the system 300. For example, the telematics unit 304 may send notifications 334 of vehicle status, access permission requests 326, or other information to the primary portable electronic device 316. The telematics unit 304 may also send notifications 336 to the secondary portable electronic device 320, such as a notification that an access permission request 326 has been granted or denied. In some embodiments, the primary portable electronic device 316 may further be configured to send permission notifications 338 directly to a secondary portable electronic device 320 indicating the receipt or outcome of an access permission request 326.

FIG. 4 depicts exemplary configurations of a visual recognition device 402 and biometric recognition devices 404, 406 in a vehicle interior in accordance with an illustrative embodiment. The visual recognition device 402 may be a camera, video camera, or the like. Biometric recognition devices may include a fingerprint reader 404 or other biometric data collection device 406. Visual and biometric recognition devices 402, 404, and 406 may be located, for example, on a passenger-side dashboard 408 or an overhead console 410, or in any other interior or exterior location accessible to a secondary user. In some embodiments, the apparatus 400 may be configured to collect images or biometric data of a person inside the vehicle, and may be used to execute the verification step 218 shown above with reference to FIG. 2. For example, following receipt 202 of an access permission request 326 and completion of evaluation process 204, a secondary user may enter the vehicle and be instructed to provide an image, fingerprint, or similar identity verification information. If instructed to provide an image, the secondary user may position his/her face in front of a camera 402 so a photo may be taken of the secondary user's face for comparison as described above in relation to the verification step 218 of FIG. 2. If instructed to provide a fingerprint, the secondary user may place his/her finger on fingerprint reader 404 so a fingerprint may be scanned for comparison with known fingerprint data. It will be readily apparent to those skilled in the art that the configurations of camera 402, fingerprint reader 404, and/or any other biometric recognition device 406 depicted in FIG. 4 are exemplary and may be positioned in various other locations in the interior of a vehicle, or include any other biometric input devices instead of or in addition to a camera and/or fingerprint reader.

In some embodiments, the camera 402, fingerprint reader 404, and/or any other biometric recognition device 406 may be located on the exterior of the vehicle. In such embodiments, in addition or as an alternative to what was described above with reference to FIGS. 1-4, the vehicle may store, either locally or in a remote database, pictures and/or biometric information of a number of primary and secondary users. A user may gain access to the vehicle by having the user's biometric information, such as fingerprint, palm print, or the like, scanned by the fingerprint reader 404 and/or other biometric recognition device 406. In some embodiments, the camera 402 may take a picture of the user. The picture and/or biometric information of the user may be compared to the information stored in the database to determine if the user can be granted access to the vehicle. In some embodiments, the database may further store information regarding the level of control each user is granted once inside the car and that level of control may be automatically granted once it is determined that the user is inside the car. In some embodiments, the vehicle may send a message to the primary user device to inform the primary user that the secondary user is requesting access or has already gained access to the vehicle. The primary user may require further authentication and/or customize the level of control granted to the secondary user via the primary user device.

It is noted that the examples may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A vehicle access method, comprising:
   receiving a permission parameter from a primary user authorizing a secondary user to access less than all functionality of a vehicle available to the primary user, wherein the permission parameter is not sent to a portable electronic device in the possession of the secondary user;
   receiving an access permission request from the portable electronic device in the possession of the secondary user;
   receiving a location of the portable electronic device in the possession of the secondary user;
   evaluating, at processing circuitry of the vehicle, the access permission request for compliance with the permission parameter, wherein the permission parameter comprises a vicinity of the vehicle within which the location of the portable electronic device must be;

in the event that the access permission request does not with the permission parameter, denying the secondary user access to the vehicle and sending a notification to the primary user;

in the event that the access permission request complies with the permission parameter, unlocking a door of the vehicle to allow the secondary user to access the vehicle;

after the secondary user enters the vehicle, receiving verification of the identity of the secondary user, wherein the verification is performed by a biometric collection device located within the vehicle; and after receiving verification of the identity of the second user, providing the secondary user with additional functionality of the vehicle based on the verification of the identity of the secondary user.

2. The method of claim 1, wherein verifying the identity of the secondary user comprises obtaining at least one of a fingerprint of the secondary user and a photograph of the secondary user.

3. The method of claim 1, further comprising activating one or more anti-theft measures based at least in part on a result of the identity verification step.

4. The method of claim 1, wherein the permission parameter comprises a time window during which the secondary user may access the vehicle.

5. The method of claim 1, wherein the notification to the primary user includes a request for secondary access approval from the primary user.

6. The method of claim 5, further comprising the vehicle receiving a secondary access approval from the primary user and unlocking the door of the vehicle based on the secondary access approval.

7. A system comprising:
a vehicle telematics unit configured to:
receive and store permission parameters for granting keyless access to a vehicle;
receive access permission requests, wherein the access permission requests are independent of the permission parameters;
receive a location of a user;
locally evaluate access permission requests for compliance with permission parameters, wherein the access permission requests comprise a vicinity of the vehicle within which the location of the user must be;
unlock a door of the vehicle to enable access to the vehicle in the event that the access permission request is in compliance with the permission parameters, and not unlock a door in the event that the access permission request is not in compliance with the permission parameters;
send a notification to a primary user different from the user in the event that the access permission request is not in compliance with the permission parameters;
verify the identity of the user after the door of the vehicle is unlocked and the user enters the vehicle, wherein the verification is performed by at least one visual or biometric recognition device located within the vehicle; and
provide the user with additional functionality of the vehicle based on the verification of the identity of the user after the user enters the vehicle.

8. The system of claim 7, wherein the at least one visual or biometric recognition device comprises a fingerprint scanner.

9. The system of claim 7, wherein the at least one visual or biometric recognition device comprises a camera.

10. The system of claim 7, further comprising at least one anti-theft device configured to activate based on the at least one visual or biometric recognition device determining that an unauthorized user is present.

11. The system of claim 10, wherein the at least one anti-theft device comprises at least one of an alarm, a notification sent to a user, and a vehicle tracking system.

12. The system of claim 7, wherein the vehicle telematics unit comprises a microcontroller configured to cause unlocking of the door of the vehicle.

13. The system of claim 7, wherein the vehicle telematics unit comprises a physical memory configured to store the permission parameters.

14. The system of claim 7, further comprising remote computer storage configured to store the permission parameters, wherein the vehicle telematics unit is configured to communicate via a network with the remote computer storage.

* * * * *